(12) United States Patent
Lee (10) Patent No.: US 6,388,701 B1
(45) Date of Patent: May 14, 2002

(54) DEVICE AND METHOD FOR REMOVING CO-CHANNEL INTERFERENCE SIGNAL IN MODULATION/DEMODULATION RECEIVER HAVING REFERENCE SIGNAL

(75) Inventor: Myeong-Hwan Lee, Kyonggi-do (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/304,269

(22) Filed: May 6, 1999

(30) Foreign Application Priority Data

May 7, 1998 (KR) .............................. 98-16268

(51) Int. Cl.⁷ ................................ H04N 5/21
(52) U.S. Cl. .................. 348/21; 348/725; 348/607; 348/470; 375/232; 375/233; 375/346
(58) Field of Search .................. 348/21, 725, 726, 348/723, 724, 470, 607, 608, 614; 375/346, 348, 350, 232, 233, 264, 324; H04N 5/21, 5/44

(56) References Cited

U.S. PATENT DOCUMENTS

| | | | | |
|---|---|---|---|---|
| 5,546,132 A | * | 8/1996 | Kim et al. | 348/607 |
| 5,550,596 A | * | 8/1996 | Strolle et al. | 348/607 |
| 5,572,547 A | * | 11/1996 | Citta et al. | 375/232 |
| 5,594,496 A | * | 1/1997 | Nielsen et al. | 348/21 |
| 5,629,958 A | * | 5/1997 | Willming | 375/295 |
| 5,661,528 A | * | 8/1997 | Han | 348/607 |
| 5,684,827 A | * | 11/1997 | Nielsen | 375/232 |
| 5,712,873 A | * | 1/1998 | Shiue et al. | 375/233 |
| 5,793,417 A | * | 8/1998 | Lee | 348/21 |
| 5,821,988 A | * | 10/1998 | Citta et al. | 348/21 |
| 5,828,404 A | * | 10/1998 | Krishnamurthy et al. | 348/21 |
| 5,886,748 A | * | 3/1999 | Lee | 348/614 |
| 5,995,135 A | * | 11/1999 | Limberg | 348/21 |
| 5,999,223 A | * | 12/1999 | Patel et al. | 348/555 |
| 6,201,564 B1 | * | 3/2001 | Limberg | 348/21 |
| 6,226,049 B1 | * | 5/2001 | Oh | 348/607 |
| 6,229,560 B1 | * | 5/2001 | Jun | 348/21 |

* cited by examiner

Primary Examiner—John W. Miller
Assistant Examiner—Jean W. Désir
(74) Attorney, Agent, or Firm—Sughrue Mion, PLLC (57) ABSTRACT

A modulation/demodulation receiver having a reference signal in a digital communication system. A method for signal processing and co-channel interference signal removal in the receiver includes the steps of processing an input signal to be at a predetermined multilevel, feeding the processed signal to an adaptive equalizer, determining the type of multilevel from the signal applied to the adaptive equalizer and selecting an operation mode from at least two multilevel operation modes, for the adaptive equalizer and blocks downstream from the adaptive equalizer, and causing the adaptive equalizer to adaptively equalize the signal at the predetermined multilevel in the selected operation mode and remove co-channel interference.

17 Claims, 7 Drawing Sheets

DEVICE AND METHOD FOR REMOVING CO-CHANNEL INTERFERENCE SIGNAL IN MODULATION/DEMODULATION RECEIVER HAVING REFERENCE SIGNAL

BACKGROUND OF THE INVENTION

1. Field of the Invention

The present invention relates to a digital communication system, and in particular, to a modulation/demodulation receiving system having a reference signal.

2. Description of the Related Art

A digital communication system is known in which a transmitter transmits a reference signal along with an original signal to a receiver so that the receiver can remove or minimize problems caused by interference, multipath, and the like on a transmission channel. The aim of transmitting the reference signal, for example, a PN (Pseudo-Noise) sequence is to enable the receiver to sufficiently reflect channel characteristics.

A co-channel interference processing method has been disclosed in "Guide to the Use of the Digital Television Standard for HDTV Transmission", United States Advanced Television System Committee, Apr. 12, 1995, pp. 104–107. In the above method, an HDTV (High Definition TeleVision) signal in VSB (Vestigial Side Band) is described by way of example.

Figure 1:
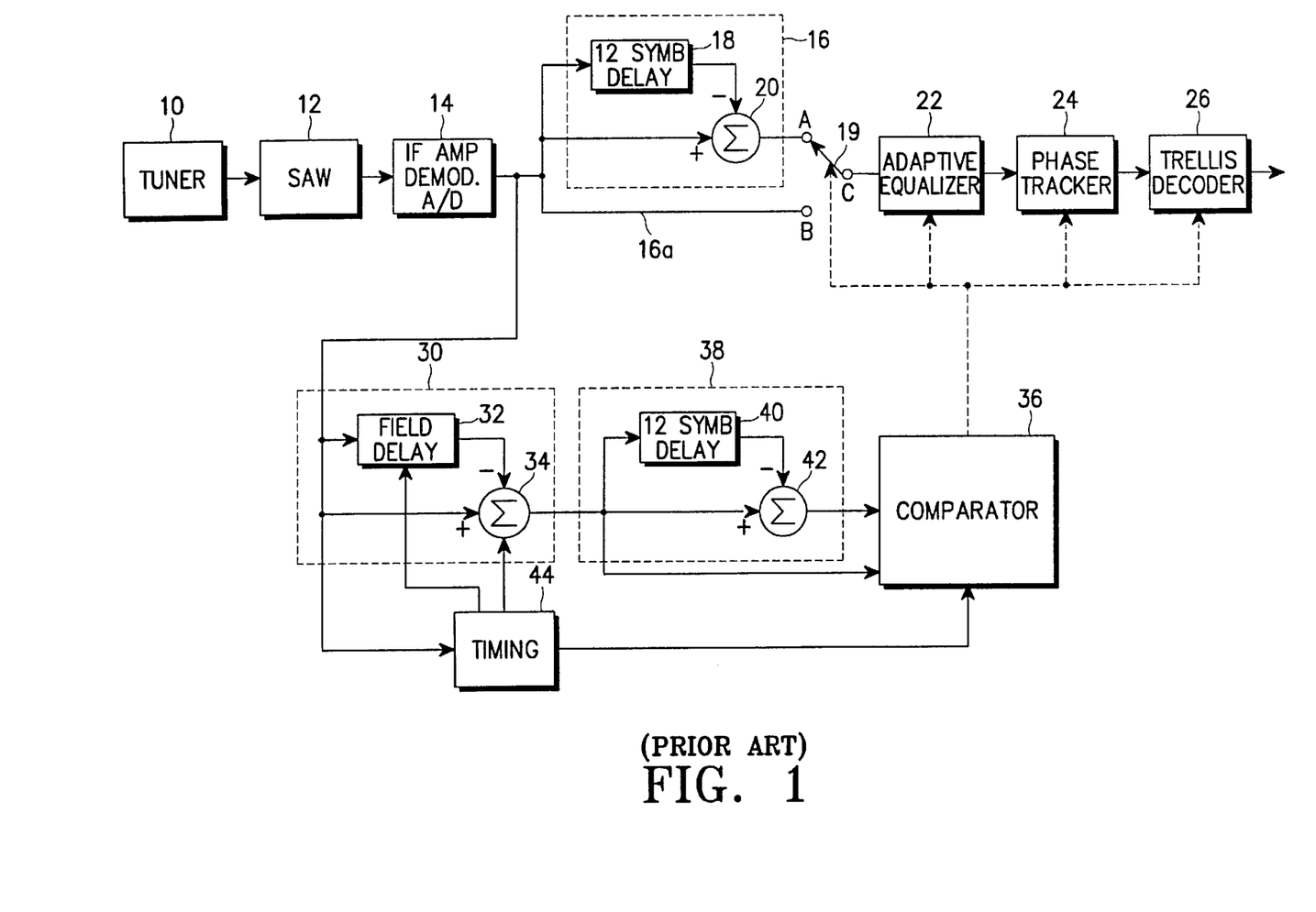
FIG. 1 is a partial block diagram of a conventional receiver.

A receiving system suggested in the method is similar to that shown in FIG. 1. FIG. 1 is a partial block diagram of a conventional receiver (see FIG. 1 in U.S. Pat. No. 5,594,496).

For simultaneous broadcast of a VSB signal and a signal of the currently used broadcast system, namely, NTSC (National Television System Committee) on the same channels, a VSB transmission system implements an NRF (NTSC Rejection Filter)-related operation. The major NRF processing in VSB is to employ a comb filter 16 for removing NTSC carriers where energy is concentrated.

Figure 3A:
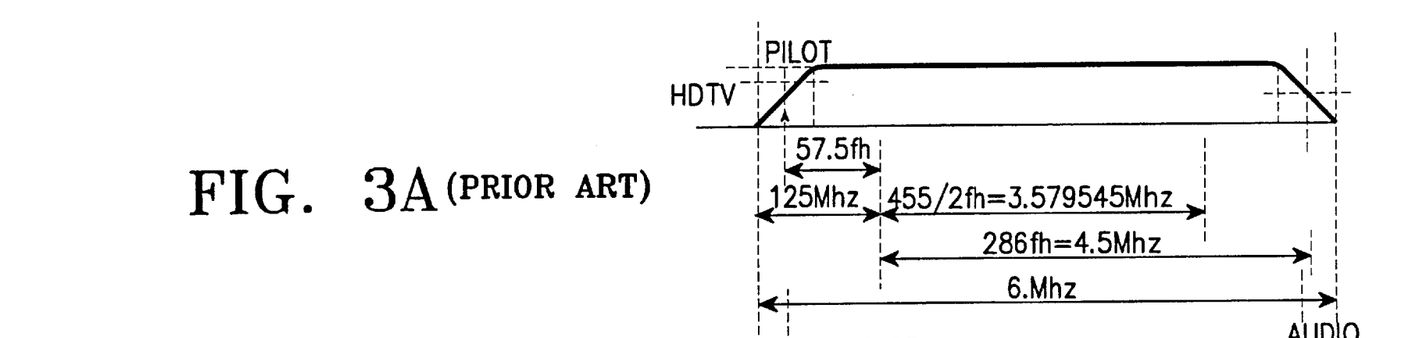
FIG. 3A is a graph showing the RF spectrum of an HDTV signal.
Figures 3B, 3C:
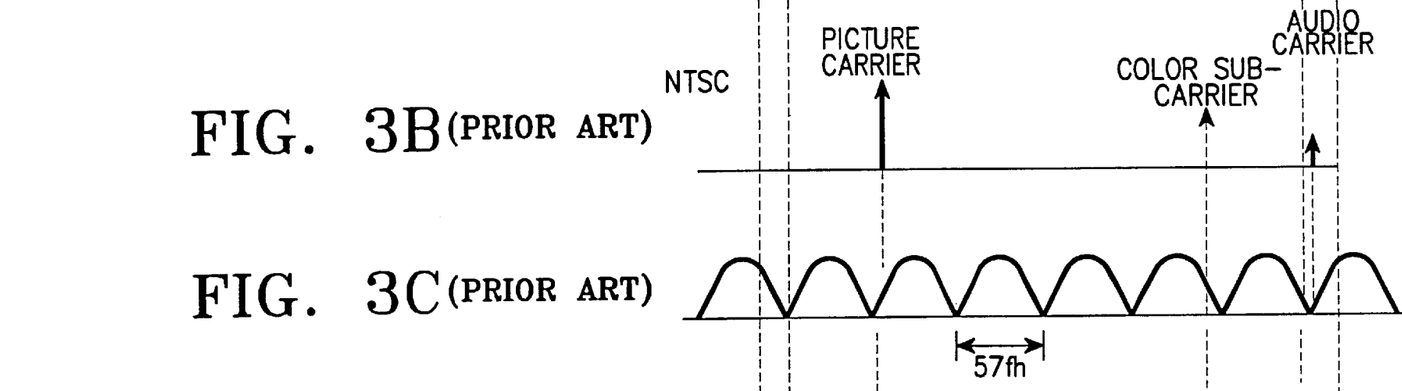
FIG. 3B is a graph showing the RF spectrum of an NTSC signal.
FIG. 3C is a graph showing a frequency characteristic of an NTSC rejection filter.
Figure 3D:
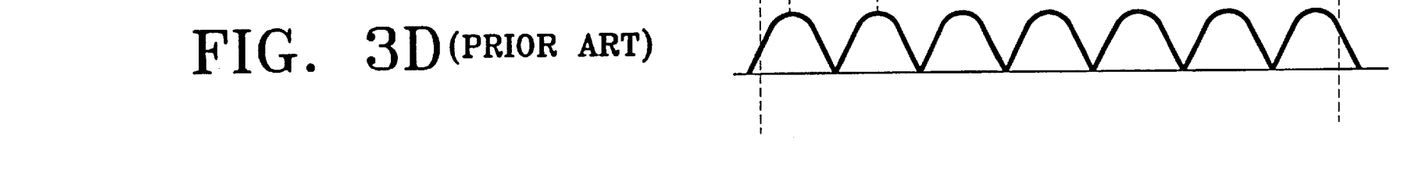
FIG. 3D is a graph showing a frequency characteristic of an NTSC extraction filter.

More specifically, if an HDTV signal in GA-VSB (Grand Alliance-VSB) and an NTSC signal are present together in the same channel, a relationship exists between them, as shown in FIGS. 3A and 3B. Here, FIGS. 3A to 3D are identical to FIGS. 4A to 4D of U.S. Pat. No. 5,546,132, respectively. FIGS. 3A and 3B respectively illustrate the RF spectra of an HDTV signal and an NTSC signal, and FIGS. 3C and 3D respectively illustrate frequency characteristics of an NTSC rejection and an NTSC extraction filter.

Figure 2:
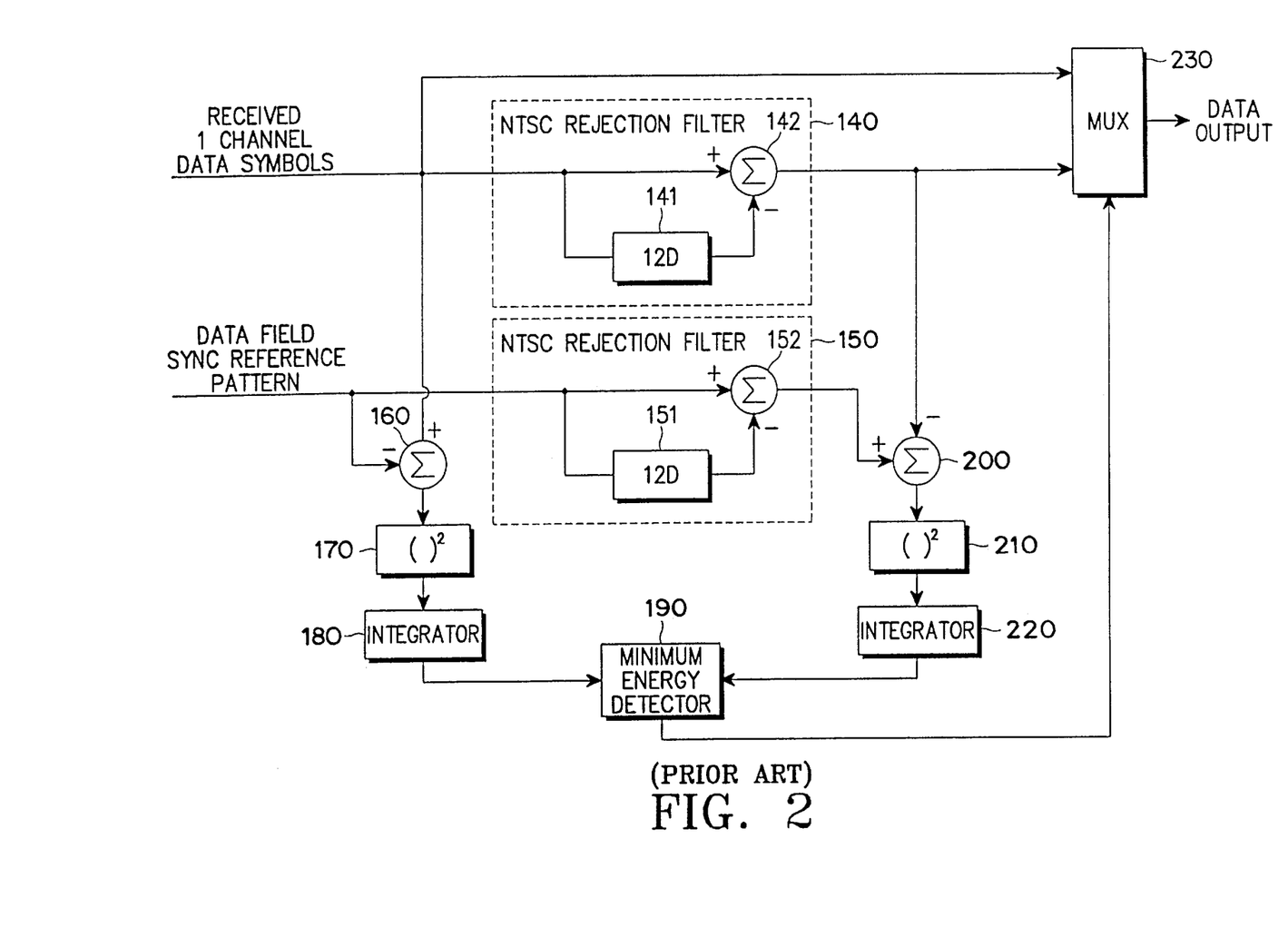
FIG. 2 is a block diagram of a general NTSC interference detector.

Common methods of removing co-channel interference include removal of carriers (e.g., picture carrier, color carrier, and audio carrier) where energy is concentrated. GA-VSB uses comb filters (i.e., NTSC rejection filters) 140 and 150 having delays 141 and 151 for delaying 12 symbols and subtracters 142 and 152 for obtaining the difference between an undelayed symbol from a delayed symbol in order to remove co-channel interference. Except for slight changes to the reference numerals, FIG. 2 is identical to FIG. 3 of U.S. Pat. No. 5,546,132 and FIG. 10.8 of the aforementioned volume, p.106.

Since NTSC carriers are present around the null point as shown in FIG. 3C, if a received signal passes through the comb filters 140 and 150 of FIG. 2, much of the NTSC interference is removed. The NTSC interference can also be removed by use of a notch filter in which NTSC carriers are present around the null point.

As described above, the conventional receivers include a switching portion (switch 19 of FIG. 1 and multiplexer 230 of FIG. 2) for selecting an NRF-processed signal at 15 levels and a non-NRF processed signal at 8 levels on the basis of the selection of an NRF block for removing co-channel interference and adjusting blocks for driving the NRF block. Therefore, the input of an adaptive or channel equalizer downstream from the NRF block depends upon whether the NTSC rejection filter is operated or not. That is, the equalizer is configured to accommodate both the 8-level and 15-level signals. Because the 15-level signal is incremented in the number of signal levels from the 8-level signal due to comb filtering, the equalizer should have an input limit ranging up to 15 levels.

Also, even when the input of the equalizer falls in the required range by reducing the gain of a 15-level signal, constraints may be imposed on the resolution at the input terminal of the equalizer or bias errors can be generated due to rounding.

SUMMARY OF THE INVENTION

An object of the present invention is to provide a device and method for processing a multilevel input of a predetermined type in one or more multilevel operation modes in a modulation/demodulation receiver of a digital communication system.

Another object of the present invention is to provide a receiver having an equalizer capable of operating both in an 8-level mode and in a 15-level mode for an 8-level input in VSB.

A further object of the present invention is to provide a device and method for removing or reducing multipath on a modulation/demodulation transmission channel with a reference signal.

Still another object of the present invention is to provide a device and method for removing co-channel interference on a modulation/demodulation transmission channel with a reference signal.

A still further object of the present invention is to provide a device and method for implementing equalization and NRF operation together without requiring an extra component.

To achieve the above objects, there is provided a method for signal processing and co-channel interference signal removal in a modulation/demodulation receiver having a reference signal in a digital communication system. In the method, an input signal is processed to be at a predetermined multilevel and fed to an adaptive equalizer, the type of the multilevel is determined from the signal applied to the adaptive equalizer, an operation mode is selected from at least two multilevel operation modes, for the adaptive equalizer and blocks downstream from the adaptive equalizer, and the adaptive equalizer adaptively equalizes the signal at the predetermined multilevel in the selected operation mode and removes co-channel interference.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Preferred embodiments of the present invention will be described in detail with reference to the attached drawings. It is to be noted that like reference numerals denote the same components in the drawings and a detailed description of a known function or structure of the present invention will be omitted if it obscures the subject matter of the present invention. The following description is conducted on a receiver in a GA-VSB digital communication system for better understanding of the present invention.

Figure 4:
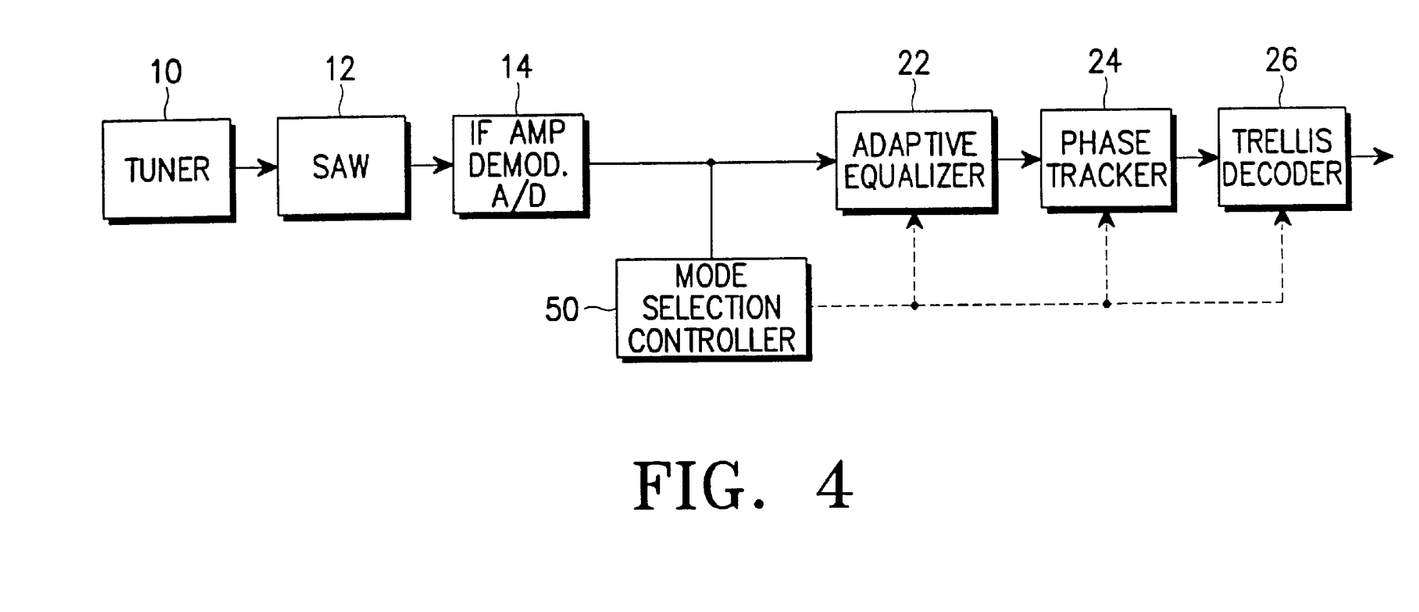
FIG. 4 is a partial block diagram of a receiver according to an embodiment of the present invention.

FIG. 4 is a partial block diagram of a receiver according to an embodiment of the present invention. The difference between FIG. 1. and FIG. 4 is that comb filter 16, field comb circuit 30, comparator 36, comb filter 38, and a timing circuit 44 of FIG. 1 are replaced by a mode selection controller 50 in FIG. 4. That is, the output of a block 14, identifying an IF amplifier demodulator and A/D converter, is directly fed to an adaptive equalizer 22. In the embodiment of the present invention, the adaptive equalizer 22 performs NTSC interference rejection as well as equalization, as compared to the conventional comb filters (16 and 38 of FIG. 1 and 140 and 150 of FIG. 2) dedicated to NTSC interference rejection.

According to the features of the present invention, the adaptive equalizer 22 can be limited to the function of equalization in which a multi-level input of a predetermined type is processed in one or more multi-level operation modes.

Considering that the adaptive equalizer 22 operates in an LMS (Least Mean Square) algorithm, it is preferable that the adaptive equalizer 22 accommodates an input at a predetermined multilevel rather than an input at a multilevel changed by a comb filter. A conventional adaptive equalizer selectively operates for 8- and 15-level inputs.

Therefore, the embodiment of the present invention is characterized by input of a predetermined type, for example, an 8-level signal, and operation of the adaptive equalizer in operation modes corresponding to one or more types (e.g., 8 level and 15 level) according to the presence or absence of NRF processing. In FIG. 4, the mode selection controller 50 determines whether an input signal contains co-channel interference. Upon the presence of the co-channel interference, it provides a signal for operating the adaptive equalizer 22, a phase tracker 24, and a trellis decoder 26 in a 15-level mode. On the other hand, upon the absence of the co-channel interference, it provides a signal for operating them in an 8-level mode. For this purpose, the mode selection controller 50 compares MSEs (Mean Square Errors) at the front and back of an NRF block as in U.S. Pat. No. 5,546,132, obtains NTSC components as in U.S. Pat. No. 5,446,132, detects NTSC synchronization, or uses a GCR (Ghost Cancellation Reference) signal.

Figure 5:
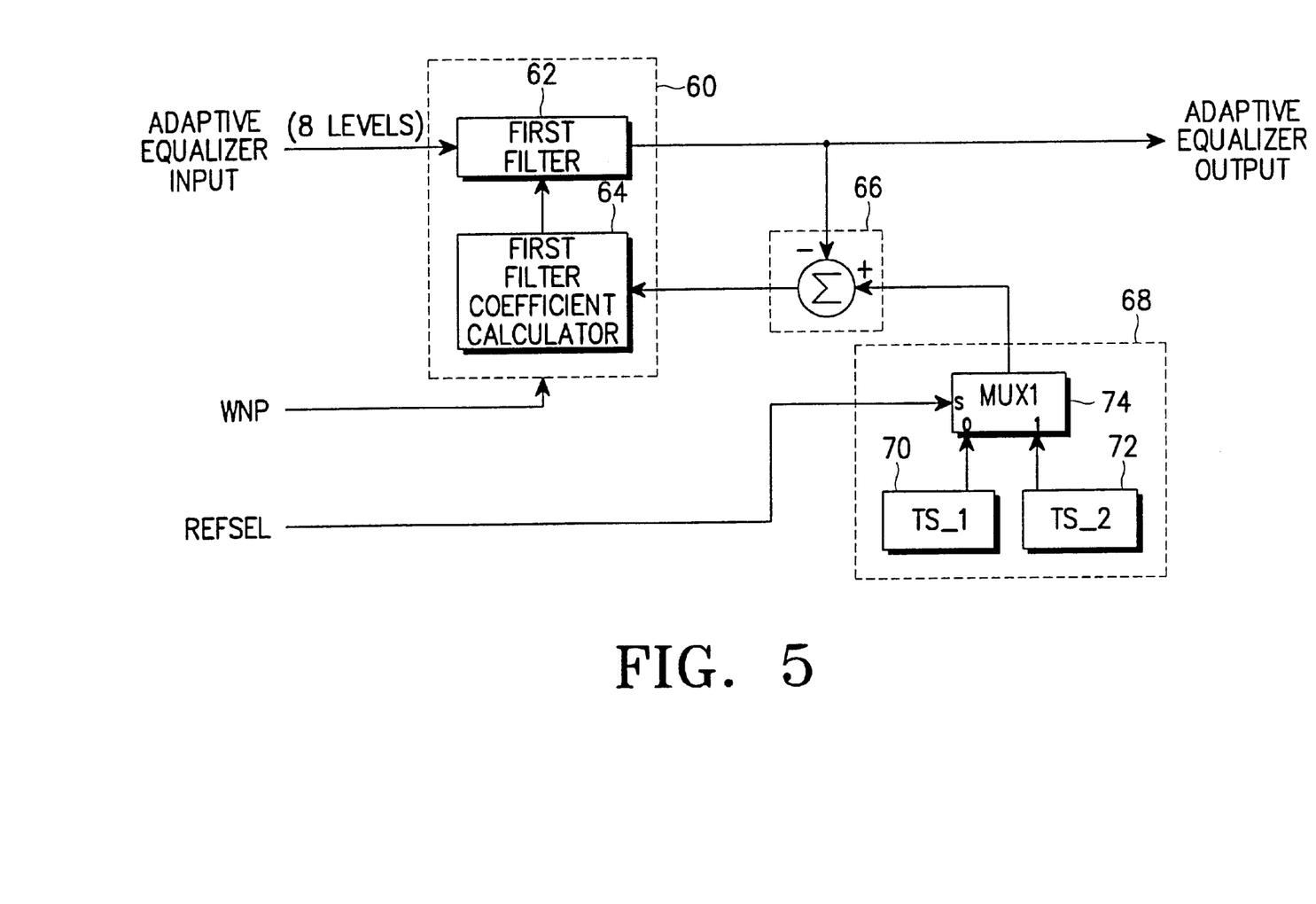
FIG. 5 is a block diagram of an embodiment of an adaptive equalizer according to the present invention.
Figure 6:
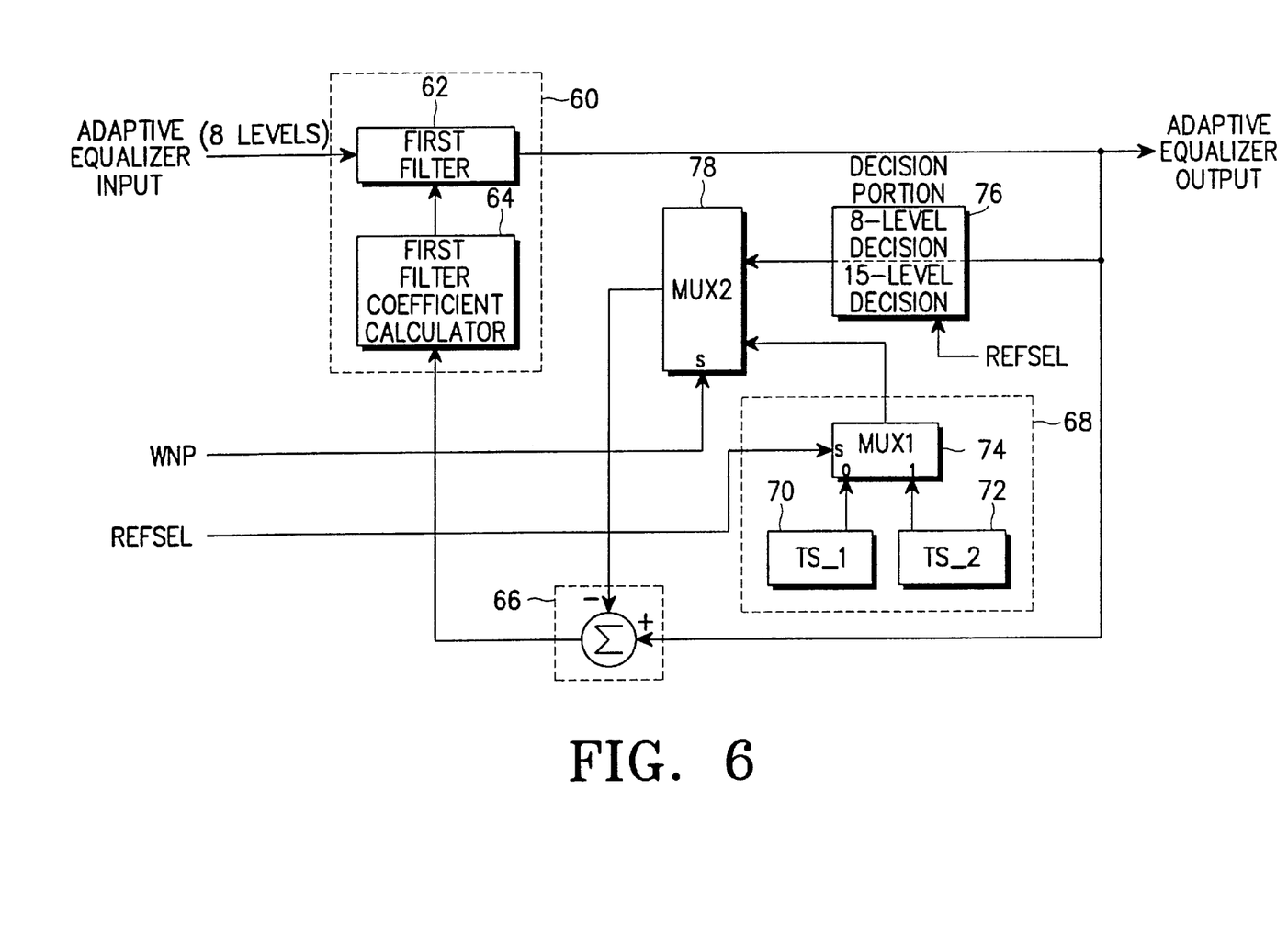
FIG. 6 is a block diagram of another embodiment of an adaptive equalizer according to the present invention.
Figure 7:
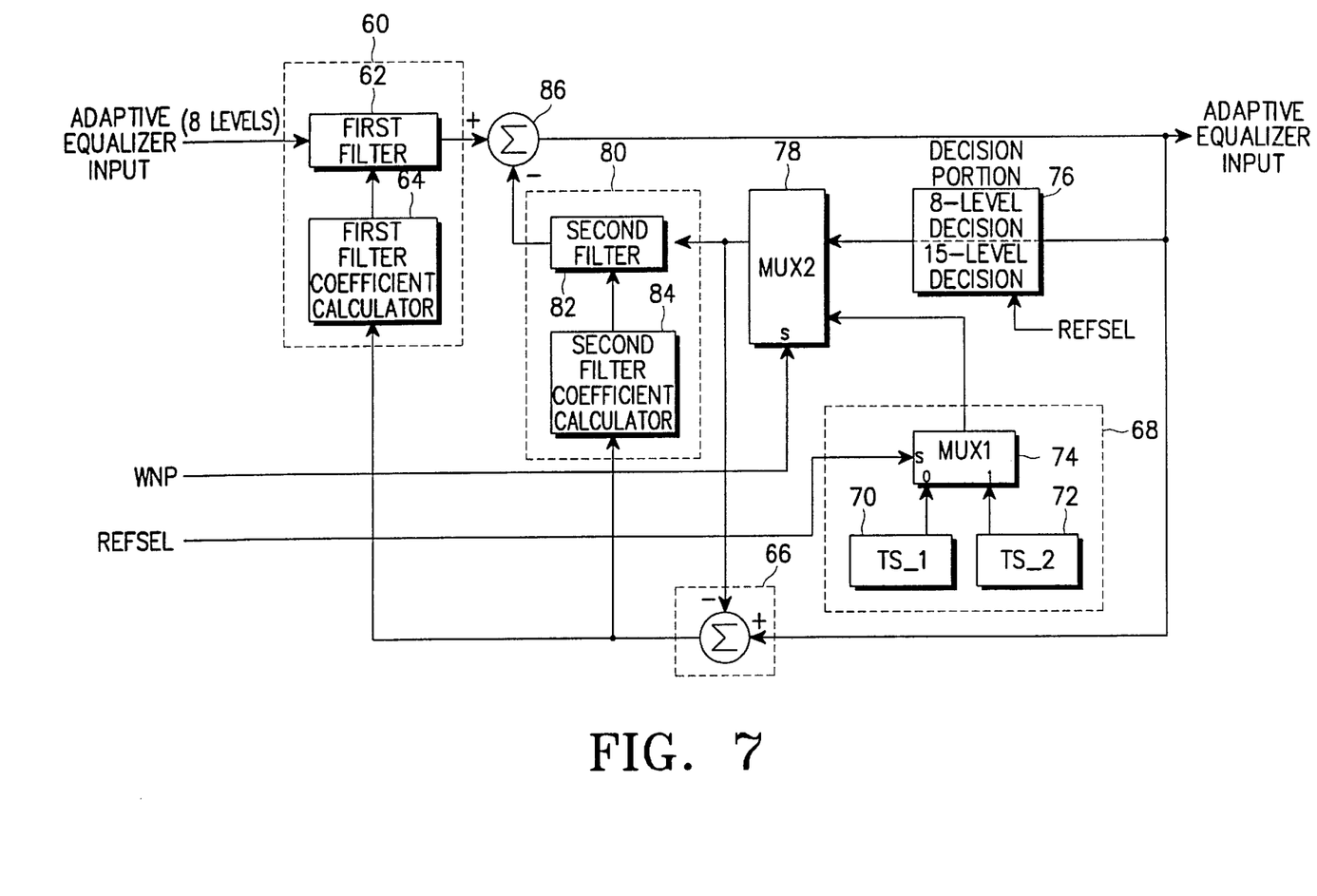
FIG. 7 is a block diagram of a third embodiment of an adaptive equalizer according to the present invention.

FIGS. 5, 6, and 7 are block diagrams of different embodiments of the adaptive equalizer 22 according to the present invention.

Referring to FIG. 5, the adaptive equalizer 22 includes a first adaptive filter portion 60 of an FIR (Finite Impulse Response) type, having a first filter 62 and a filter coefficient calculator 64, an error calculator 66 for obtaining an error in the adaptive equalizer output, and a reference signal generator 68 for generating a reference signal to the error calculator 66. A signal REFSEL for selecting a reference signal is applied to the reference signal generator 68, and a window pulse WNP indicating a reference signal period is applied to the first adaptive filter portion 60.

The error calculator 66 includes only a subtracter, and the reference signal generator 68 has a multiplexer (MUX1) 74 for selectively outputting a training sequence TS_1 70 as a first reference signal and a training sequence TS_2 72 as a second reference signal according to the signal REFSEL.

It is assumed here that the first reference signal TS_1 70 is for an 8-level signal and the second reference signal TS_2 72 is for a 15-level signal converted from an 8-level signal due to comb filtering for removing co-channel interference.

An input signal of the receiver shown in FIG. 4 can be divided into a reference signal period such as a PN sequence period and a random data period. The input signal is directly fed to the adaptive equalizer 22 from the block 14 through a tuner 10 and a SAW (Surface Acoustic Wave) filter 12, without comb filtering. Thus, the signal is always an 8-level signal.

The 8-level signal received in the adaptive equalizer 22 is filtered using a filter coefficient renewed by an error obtained during the reference signal period and output as an adaptive equalizer output signal. The error calculator 66 receives the adaptive equalizer output signal and a reference signal selected by the signal REFSEL (the 8-level reference signal TS_1 70 is selected at an initial stage), and calculates the error between the selected reference signal and the adaptive equalizer output signal. The first filter coefficient calculator 64 applies a filter coefficient renewed by the calculated error to the first filter 62. That is, the first adaptive filter portion 60 filters the 8-level input signal using the filter coefficient. For the random data period, a filter coefficient is calculated from the error between an adaptive equalizer output corresponding to random data and a selected reference signal, and the first adaptive filter portion 60 filters an input signal using the filter coefficient.

In a normal state in which an NTSC co-channel interference signal is not present, the mode selection controller 50 of FIG. 4 causes the 8-level reference signal TS_1 70 to be selected by the signal REFSEL. In a state requiring comb filtering due to the presence of an NTSC co-channel interference signal, the mode selection controller 50 causes the 15-level reference signal TS_2 72 to be selected and then causes the adaptive filter portion 60 to change from an 8-level mode to a 15-level mode. Therefore, the NTSC co-channel interference signal contained in an HDTV signal is removed by the adaptive equalizer 22 of FIG. 5.

For a signal including a reference signal such as an HDTV signal, the reference signal for a 15-level signal changed from comb filtering is fed to the first adaptive filter portion 60, which operates in the 15-level mode without changing bits at the 8-level input terminal, preventing a bias error encountered in the prior art.

Set forth below is an equation expressing the operation of the adaptive equalizer 22 according to an LMS algorithm for a clearer understanding of how the input signal is processed while fixed at 8 levels.

With the input, output, and filter coefficient of the first filter 62 given as $X^T(n)$, z(n), and W(n), the LMS algorithm is expressed as (Equation 1)

$$z(n)=W^T(n-1)X^T(n) \quad (1)$$

$$e(n)=d(n)-Z(n) \quad (2)$$

$$W(n)=W(n-1)+2\mu e(n)X^T(n) \quad (3)$$

where $X^T=[x(n), x(n-1), \ldots, x(n-N+1)]$, $W^T=[w_0, w_1, \ldots, w_{N-1}]$, and d(n) is a reference signal value.

The LMS algorithm is performed toward minimization of $E[(e^2(n)]$.

Referring to equation 1, as the input level of the conventional adaptive equalizer 22 is changed (e.g., from 8 levels to 15 levels or vice versa), x(n) in both (1) and (3) should be changed to (x(n)__8) for an 8-level signal or (x(n)__15) for a 15-level signal. Hence, the conventional adaptive equalizer 22 selectively receives (x(n)__8) and (x(n)__15). In this case, a number of input lines are required which is equal to the number of bits required to operate the conventional adaptive equalizer 22 in both modes, thereby complicating the structure of the conventional adaptive equalizer 22. On the contrary, an input signal is always fixed at 8 levels (x(n)__8) regardless of NTSC interference and a reference signal is selected by the signal REFSEL in the embodiment of the present invention. Due to the fixed input level of the adaptive equalizer 22, bit assignment is easy and there is no need for changing x(n) in (1) and (3) of equation 1.

FIG. 6 illustrates another embodiment of the adaptive equalizer 22 involving a decision process generally used in digital communication. This is similar to the structure of FIG. 5, but the difference lies in that a multiplexer (MUX2) 78 for selecting a reference signal and a decision signal by the window pulse WNP and a decision portion 76 are added for adaptive equalization by decision made for random data. The decision portion 76 decides an error as a value approximate to a corresponding 8- or 15-level value (e.g., 7, 5, 3, 1, −1, −3, −5, and −7 for 8 levels, and 14, 12, 10, 8, 6, 4, 2, 0, −2, −4, −6, −8, −10, =12, and −14 for 15 levels) by selectively operating an 8-level decider or a 15-level decider according to the signal REFSEL. The multiplexer 78 selects a reference signal selected by the reference signal generator 68 during the reference signal period and a decision signal generated from the decision portion 76 during the random data period according to the window pulse WNP. The error calculator 66 calculates the error between the output signal of the multiplexer 78 and the adaptive equalizer output signal and feeds its output signal to the filter coefficient calculator 64.

FIG. 7 illustrates a DFE (Decision Feedback Equalizer) most generally used for digital communication. This equalizer is the same as that of FIG. 6, except for addition of a second adaptive filter portion 80 of an IIR (Infinite Impulse Response) type including a second filter 82 and a second filter coefficient calculator 84, and a subtracter 86.

While two reference signals are employed in the equalizers of FIGS. 5, 6, and 7, it should be understood that the number of reference signals can be increased.

As described above, the adaptive equalizer of the present invention can operate in plural modes for signals of different multilevel types without the need of physical operation of an input signal, and perform an NRF operation. Furthermore, the equalizer can be constituted with a reduced number of hardware components because there is no need for an NRF block and its adjusting blocks used in the prior art.

While the present invention has been described in detail with reference to the specific embodiments, they are mere exemplary applications. Thus, it is to be clearly understood that many variations can be made by anyone skilled in the art within the scope and spirit of the present invention.

What is claimed is:

1. A co-channel interference signal removing method in a modulation/demodulation receiver having a reference signal in a digital communication system, comprising the steps of:

(1) processing an input signal to be at a predetermined multilevel, and applying the processed signal to an adaptive equalizer;

(2) determining a multilevel type from the processed signal applied to the adaptive equalizer and selecting an operation mode from at least two multilevel operation modes, for the adaptive equalizer and blocks downstream of the adaptive equalizer; and (3) causing the adaptive equalizer to adaptively equalize the signal at the predetermined multilevel in the selected operation mode and remove co-channel interference.

2. The method of claim 1, wherein step (3) comprises the steps of:

generating a first reference signal for a multilevel signal upon the absence of co-channel interference; and generating a second reference signal for a multilevel signal upon the presence of co-channel interference.

3. The method of claim 2, wherein the first and second reference signals are predetermined.

4. The method of claim 3, wherein the number of the second reference signals is at least one.

5. A modulation/demodulation receiver having a reference signal in a digital communication system, comprising:

a block for processing an input signal to be a multilevel signal of a predetermined type after subjecting the signal to tuning, IF processing, and demodulation;

a mode selection controller for selecting an operation mode of the multilevel signal with respect to a reference signal period and a random data period depending upon whether a co-channel interference signal is present or absent in the multilevel signal; and an adaptive equalizer for equalizing and removing co-channel interference from the multilevel signal using a predetermined reference signal in the operation mode selected from at least two multilevel operation modes.

6. The receiver of claim 5, wherein the adaptive equalizer comprises:

a reference signal generator for selectively generating predetermined first and second reference signals according to the selection of the mode selection controller;

an error calculator for obtaining the difference between the selected reference signal and an adaptive equalizer output signal; and an adaptive filter portion for receiving the multilevel signal, obtaining a filter coefficient based on the obtained difference, and performing an FIR (Finite Impulse Response) filtering using the filter coefficient.

7. The receiver of claim 5, wherein the adaptive equalizer comprises:

a reference signal generator for selectively generating predetermined first and second reference signals according to the selection of the mode selection controller;

a decision portion for deciding the value of an adaptive equalizer output signal as a predetermined level value of a multilevel determined according to the mode selection;

a selector for selectively outputting a signal received from the decision portion and a reference signal selected in the reference signal generator;

an error calculator for obtaining the difference between the selected reference signal and the adaptive equalizer output signal; and an adaptive filter portion for receiving the multilevel signal, obtaining a filter coefficient based on the obtained difference, and performing an FIR filtering using the filter coefficient.

8. The receiver of claim 5, wherein the adaptive equalizer comprises:

a reference signal generator for selectively generating predetermined first and second reference signals according to the selection of the mode selection controller;

a decision portion for deciding the value of an adaptive equalizer output signal as a predetermined level value of a multilevel determined according to the mode selection;

a selector for selectively outputting a signal received from the decision portion and a reference signal selected in the reference signal generator;

an error calculator for obtaining the difference between the selected reference signal and the adaptive equalizer output signal;

a first adaptive filter portion for receiving the multilevel signal, obtaining a filter coefficient based on the obtained difference, and performing an FIR filtering using the filter coefficient; and a second adaptive filter portion for receiving the output of the selector, obtaining a filter coefficient based on the obtained difference, and performing an IIR (Infinite Impulse Response) filtering using the filter coefficient.

9. The receiver of claim 6, wherein the first reference signal is generated when co-channel interference is not present in the multilevel signal, and the second reference signal is generated when co-channel interference is present in the multilevel signal.

10. The receiver of claim 9, wherein the first reference signal is for an 8-level signal, and the second reference signal is for a 15-level signal.

11. A signal processing method in a modulation/demodulation receiver having a reference signal in a digital communication system, comprising the steps of:

processing an input signal to be at a predetermined multilevel, and applying the processed signal to an adaptive equalizer;

determining a multilevel type from the processed signal applied to the adaptive equalizer and selecting an operation mode from at least two multilevel operation modes, for the adaptive equalizer and blocks downstream from the adaptive equalizer; and causing the adaptive equalizer to adaptively equalize the signal at the predetermined multilevel and the blocks downstream from the adaptive equalizer to operate in the selected operation mode.

12. The method of claim 11, wherein the adaptive equalizer uses two reference signals for input of at least two multilevel signals according to the mode selection in performing an equalization.

13. A modulation/demodulation receiver having a reference signal in a digital communication system, comprising:

a block for processing an input signal to be a multilevel signal of a predetermined type after subjecting the signal to tuning, IF processing, and demodulation;

a mode selection controller for selecting an operation mode of the multilevel signal with respect to a reference signal period and a random data period depending upon whether a co-channel interference signal is present or absent in the multilevel signal; and an adaptive equalizer for equalizing the multilevel signal using a predetermined reference signal in the operation mode selected from at least two multilevel operation modes.

14. The receiver of claim 13, wherein the adaptive equalizer comprises:

a reference signal generator for selectively generating predetermined first and second reference signals according to the selection of the mode selection controller;

an error calculator for obtaining the difference between the selected reference signal and an adaptive equalizer output signal; and an adaptive filter portion for receiving the multilevel signal, obtaining a filter coefficient based on the obtained difference, and performing an FIR filtering using the filter coefficient.

15. The receiver of claim 13, wherein the adaptive equalizer comprises:

a reference signal generator for selectively generating predetermined first and second reference signals according to the selection of the mode selection controller;

a decision portion for deciding the value of an adaptive equalizer output signal as a predetermined level value of a multilevel determined according to the mode selection;

a selector for selectively outputting a signal received from the decision portion and a reference signal selected in the reference signal generator;

an error calculator for obtaining the difference between the selected reference signal and the adaptive equalizer output signal; and an adaptive filter portion for receiving the multilevel signal, obtaining a filter coefficient based on the obtained difference, and performing an FIR filtering using the filter coefficient.

16. The receiver of claim 13, wherein the adaptive equalizer comprises:

a reference signal generator for selectively generating predetermined first and second reference signals according to the selection of the mode selection controller;

a decision portion for deciding the value of an adaptive equalizer output signal as a predetermined level value of a multilevel determined according to the mode selection;

a selector for selectively outputting a signal received from the decision portion and a reference signal selected in the reference signal generator;

an error calculator for obtaining the difference between the selected reference signal and the adaptive equalizer output signal;

a first adaptive filter portion for receiving the multilevel signal, obtaining a filter coefficient based on the obtained difference, and performing an FIR filtering using the filter coefficient; and a second adaptive filter portion for receiving the output of the selector, obtaining a filter coefficient based on the obtained difference, and performing an IIR filtering using the filter coefficient.

17. The receiver of claim 14, wherein the first reference signal is for an 8-level signal, and the second reference signal is for a 15-level signal.

* * * * *